United States Patent [19]

Bertolacini

[11] 4,203,829

[45] May 20, 1980

[54] CATALYST, METHOD OF PREPARATION AND USE THEREOF IN HYDRODESULFURIZING CRACKED NAPHTHA

[75] Inventor: Ralph J. Bertolacini, Chesterton, Ind.

[73] Assignee: Standard Oil Company (Indiana), Chicago, Ill.

[21] Appl. No.: 946,573

[22] Filed: Sep. 28, 1978

[51] Int. Cl.$^2$ .................... C10G 23/02; B01J 23/88
[52] U.S. Cl. ................................ 208/216 R; 252/465
[58] Field of Search ................ 208/216 R, 216 PP; 252/465

[56] References Cited

U.S. PATENT DOCUMENTS

| | | | |
|---|---|---|---|
| 3,269,938 | 8/1966 | Lefrancois | 208/216 R |
| 4,132,632 | 1/1979 | Yu et al. | 252/465 |
| 4,140,626 | 2/1979 | Bertolacini et al. | 208/216 R |

*Primary Examiner*—George Crasanakis
*Attorney, Agent, or Firm*—Geoffrey M. Novelli; William T. McClain; William H. Magidson

[57] ABSTRACT

Catalyst comprising magnesium oxide and aluminum oxide is prepared by dry blending particulate alumina with a dried composite of magnesia impregnated with hydrogenation metals of Group VIB and Group VIII; the catalyst is employed in selective hydrodesulfurization of cracked naphtha.

13 Claims, 2 Drawing Figures

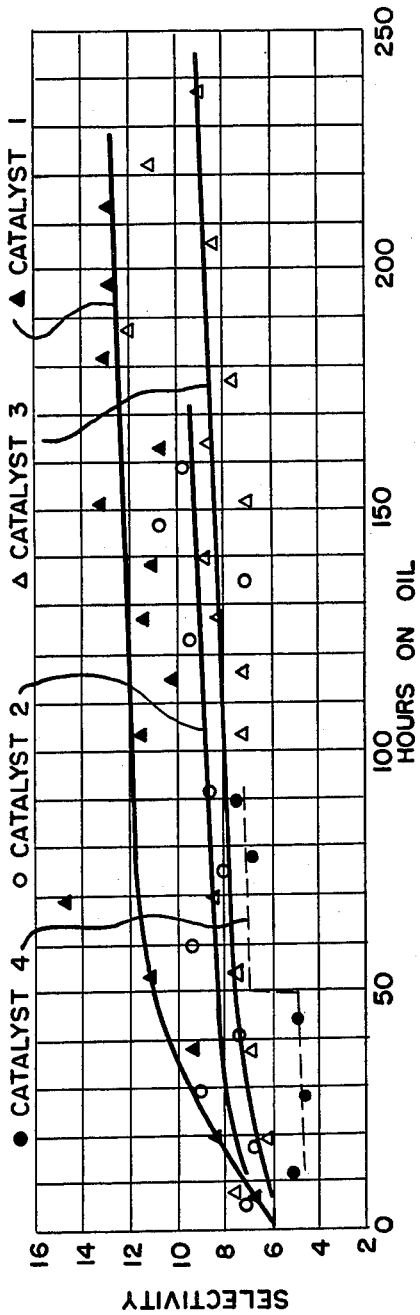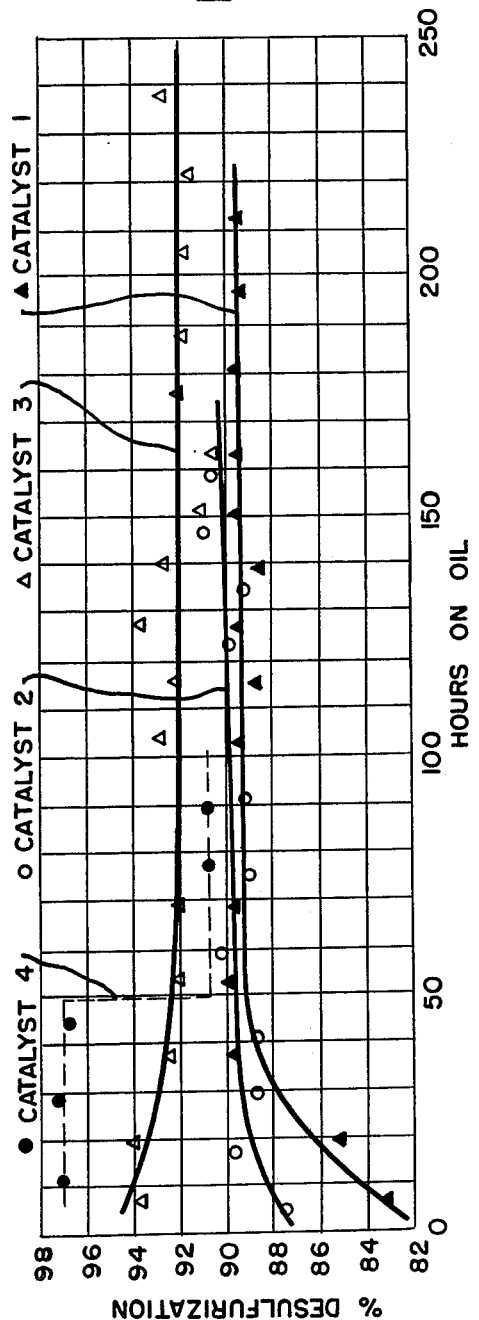

CATALYST, METHOD OF PREPARATION AND USE THEREOF IN HYDRODESULFURIZING CRACKED NAPHTHA

BACKGROUND

This invention relates to preparation of catalyst employed in a process for hydrodesulfurization of cracked naphtha suitable for gasoline. More particularly, this invention relates to selective desulfurization of cracked naphtha using a catalyst comprising aluminum oxide and cobalt-molybdenum impregnated magnesium oxide.

One of the blending components to be used in a refinery gasoline pool is cracked naphtha containing both sulfur and olefins. The sulfur which is typically present in amounts of about 0.3 wt.% or larger is both a potential air pollutant and a poison to the catalysts used in certain automobile catalytic mufflers. On the other hand, the olefins, which are typically present in an amount of about 30 wt.% or larger, have octane numbers that are higher than those of the corresponding saturates.

Today, sulfur dioxide that is generated by the burning of high sulfur fuels has been identified as one of the chief air pollutants. Hydrodesulfurization is an important method for producing fuels with relatively low sulfur concentrations; however, if the cracked naphtha is to be desulfurized without eliminating or seriously reducing the amount of olefins that are present therein, the desulfurization process must be very selective, i.e., capable of removing substantially all of the sulfur with minimal saturation of olefins (and minimal octane loss). Currently, several desulfurization catalysts that are used in the petroleum refining industry. Such desulfurization catalysts include cobalt and molybdenum and their compounds on a suitable support, nickel and tungsten and compounds thereof on a suitable support, and nickel and molybdenum and compounds thereof on a suitable support. The support, in general, is a non-acidic or weakly-acidic catalytically active alumina.

Bertolacini et al., in copending U.S. Pat. application Ser. No. 820,376, filed July 29, 1977, which is incorporated herein by reference, disclose a process for hydrodesulfurization of cracked naphtha with a catalyst comprising Group VIB and Group VIII metals deposed on a support comprising at least 70% by weight magnesium oxide and exemplifies mixtures with alumina.

While these magnesium oxide supported catalysts are excellent hydrodesulfurization catalysts the magnesia based catalysts can be relatively soft, and can have a relatively low crushing strength with abrasion losses which are commercial disadvantages for both preparing and using the catalyst in refinery operations. Bertolacini et al. disclose that alumina can be incorporated into the support by blending magnesium oxide powder with aqueous solutions of the hydrogenation metals and then sol alumina, with the resultant blend dried, ground to finely divided material, pelleted to an appropriate size, and calcined. Bertolacini et al. also teach, however, that the catalysts incorporating alumina prepared from the sol alumina blend have reduced selectivity in comparison to those catalysts prepared with an entirely magnesium oxide support.

Yu et al. in copending U.S. Pat. application Ser. No. 892,389, filed Mar. 31, 1978, which is incorporated herein by reference, disclose that the selectivity of the Bertolacini et al, catalysts can be improved by using relatively low levels of the hydrogenation metals. Yu et al. further disclose that crushing strength of the magnesia catalyst can be improved by employing molybdenum sulfide as the pilling agent or pelleting lubricant.

Wight, in U.S. Pat. No. 3,923,640 (1975), discloses preparation of hydrocracking catalyst prepared from zeolite cracking base of the low-sodium Y-type, wherein the zeolite component can be intimately admixed with a finely divided, hydrous, refractory metal oxide such as alumina; the metal oxide can also be combined with the zeolite as a hydrosol or gel, as an anhydrous activated gel, as a spray dried powder, a calcined powder, or the metal oxide precursor can be precipitated to form a gel in the presence of the zeolite. The Wight patent discloses that when mulling the zeolite with the finely divided form of the metal oxide, minor amounts of water, with or without an acid peptizing agent, are usually added to facilitate admixture.

Lefrancois, in U.S. Pat. No. 3,269,938 (1966), discloses preparation of silica-magnesia supported catalyst comprising molybdenum and nickel wherein the silica-magnesia composite is prepared prior to incorporation of the molybdenum and nickel precursors by methods of coprecipitation or by adding magnesia as a slurry in water to an acidic silica hydrosol and allowing the resulting sol to set to a hydrogel, followed by drying and calcining the hydrogel.

The general object of this invention is to provide a catalyst having improved crush strength and improved selectivity in the desulfurization of cracked naphtha in order to minimize octane loss in the product by reducing olefin saturation in the hydroprocessing. Other objects appear hereinafter.

I have found that the objects of this invention can be attained with a catalyst prepared by dry blending particulate alumina with a dried composite of magnesia impregnated with hydrogenation metals of Group VIB and Group VIII of the Periodic Table of Elements, according to the following method:

(1) forming an aqueous composition comprising dissolved Group VIB and Group VIII metal compounds and suspended magnesia;
(2) drying the composition of step 1;
(3) blending compositions comprising the product of step 2 and particulate alumina;
(4) forming the product of step 3 into pellets; and
(5) calcining said pellets.

I have unexpectedly found that in contrast to the alumina containing catalysts disclosed in the applications of Bertolacini et al. and Yu et al., which are prepared from alumina sol, improved selectivity can be achieved by incorporating alumina in the catalyst by the method of this invention, that is generally when particulate alumina is dry-blended prior to pilling or forming by adding typically powdered alumina as an admixture with the impregnated magnesia prior to such pelleting. I have further found that magnesia based catalyst incorporating alumina by the method of this invention produces improved selectivity over even the low-metals catalyst containing entirely magnesia support, disclosed by Yu et al.

Broadly, the catalyst of this invention can be prepared by impregnating commercially available magnesia, for example the magnesium oxide powder available from Mallinckrodt Chemical Company and from Basic Chemical Company, with heat-decomposable compounds of the Group VIB and Group VIII hydrogenation metals from generally, either an aqueous solution containing both metal compounds or a solution containing one of the metal compounds followed by a solution containing the other metal compound. The resulting composite can be stirred or mixed to a "paste" and then dried, generally in air, either in the mixing vessel or in separate equipment at a temperature of about 250° F.–450° F. for a period of 1 to 20 hours. As used herein, the term "paste" refers to the impregnated magnesia prior to drying, whether the material has paste-like, merely coagulated, or any other consistency. While not essential, the dried paste can be ground. The dried paste of impregnated magnesia can then be dry-blended with particulate alumina, commercially available generally as granules or as a powder whether in hydrate form such as the alpha monohydrate, boehmite, or in calcined form such as gamma alumina; other aluminas such as eta alumina and its hydrate precursors can also be similarly dry blended. While the major component of the catalyst support is magnesium oxide, sufficient particulate alumina can be blended to provide a calcined catalyst comprising about 5 to about 50 wt.% aluminum oxide, preferably about 5–30 wt.%; catalyst comprising about 8–12 wt.% aluminum oxide is particularly selective in hydrodesulfurization of cracked naphtha as later described.

The hydrogenation component of the catalyst comprises a Group VIB metal and a Group VIII metal, with the Group VIB metal present in an amount of about 4 wt.% to about 20 wt.%, preferably about 4–6 wt.%, and the Group VIII metal present in an amount of about 0.5 wt.% to about 10 wt.%, preferably about 0.5–2 wt.%, each amount being based on the total weight of the catalyst and being calculated as the oxide of the respective metal. The catalyst comprises at least one Group VIB metal selected from chromium, molybdenum and tungsten and at least one Group VIII metal selected from iron, cobalt, nickel, ruthenium, rhodium, platinum, palladium, osmium and iridium. The preferred Group VIB metal is molybdenum and the preferred Group VIII metal is cobalt. Typical water soluble salts such as cobalt nitrate, cobalt acetate, cobalt formate, and ammonium heptamolybdate can be employed to impregnate the magnesia. Under desulfurization conditions, these metals are present in the catalyst in at least one form selected from the elements, their oxides and their sulfides.

The dry blended alumina and impregnated magnesia can be formed into pellets by pilling or tableting with a conventional pilling machine or pellet mill such as those manufactured by Colton and Manistee. Pilling produces strong, uniform pellets even with the difficulty formed magnesia-based feed when powdered lubricant, such as $MoS_2$, graphite, or a vegetable-based powder is added to the impregnated magnesia with the particulate alumina in the dry blending operation. $MoS_2$ is generally added at a level of about 1 wt.% of the dry blended mixture; graphite lubricant can be added at a level of about 2 wt.% of the dry blended mixture; and powdered, vegetable-based lubricants can be added at a level of about 5 wt.% of the dry blended mixture. Best results have been obtained employing molybdenum sulfide. The pill size and properties can be controlled by the amount of fill in the dies and the machine's compression setting. The green pellet crush strength is the strength in psig before calcination.

Forming magnesia-based catalyst pellets using conventional extrusion equipment can require that water be added to the dry blended mixture of alumina and impregnated magnesia to produce an extrudable plastic; alternatively the paste of metal compounds and magnesia can be subjected to relatively limited drying before blending with the particulate alumina in order to obtain an extrudable plastic composite.

Calcination of the catalyst pellets can be carried out at a temperature as low as about 450° F. for a period of about 1–2 hours followed by a temperature of about 700° F. to about 1100° F., preferably, about 800° F. to about 1000° F., for a period of about 1.5–10 hours.

BRIEF DESCRIPTION OF THE DRAWING

FIG. 1 presents comparative desulfurization and selectivity performance of various catalysts including a catalyst of this invention.

Briefly, an embodiment of the process employing the catalyst of the present invention comprises contacting a cracked naphtha typically comprising paraffins, naphthenes, aromatics, and unsaturates in a reaction zone under hydrodesulfurization conditions and in the presence of hydrogen with said catalyst to furnish a product containing unsaturates and a reduced amount of sulfur.

Typical feedstocks that may be employed in the process using the catalyst of the present invention include catalytically-cracked naphthas and coker naphthas. Such feedstocks not only contain paraffins, naphthenes, and aromatics, but also unsaturates, such as open-chain and cyclic olefins, diolefins, and cyclic hydrocarbons with olefinic side chains. Such feedstocks generally have a boiling range of about 120° F. to about 400° F., and typically have a maximum boiling temperature of about 445° F. Cracked naphthas generally contain from about 0.1 wt.% sulfur to about 0.4 wt.% sulfur and up to about 20 to 1000 ppm of nitrogen. Coker naphthas typically contain up to about 1 wt.% sulfur and up to about 500 ppm nitrogen.

The hydrodesulfurization conditions that are employed during the process using the catalyst of the present invention comprise the following conditions: a temperature of about 450° F. to about 750° F., a total pressure of about 75 psig to about 600 psig, a hydrogen-to-hydrocarbon ratio of about 200 SCFB to about 5,000 SCFB, and a WHSV of about 0.5 to about 15 weight units of hydrocarbon per hour per weight unit of catalyst. Preferred hydrodesulfurization conditions comprise a temperature of about 525° F. to about 700° F., a total pressure of about 150 psig to about 400 psig, a hydrogen-to-hydrocarbon ratio of about 300 SCFB to about 2,000 SCFB, and a WHSV of about 2 to 10 weight units of hydrocarbon per hour per weight unit of catalyst.

It is beneficial for the proper maintenance of selectivity that the process conditions be regulated so that total vaporization of the reactants and products is present in the reaction zone. The hydrogen partial pressure should be at least 60 psia.

The following comparative examples are illustrative of this invention but do not indicate limitation upon the scope of the claims.

EXAMPLE 1

An embodiment of the catalyst of the present invention, designated Catalyst 1, containing approximately 10 wt.% aluminum oxide, with properties more fully specified in Table I, was prepared as follows: 14 lbs. of cobalt nitrate and 18 lbs. of ammonium heptamolybdate, were dissolved in 300 lbs. of hot distilled water and added to 300 lbs. of magnesia, commercially obtained from Basic Chemical Company as 98 HR magnesia; the mixture was continuously stirred in a conventional Nauta mixer and the exothermic reaction mixture was allowed to slake for approximately an hour. The impregnated magnesia paste was transferred from the Nauta mixer to conventional drying trays and dried at about 280° F. for about four hours to produce a dried paste having a total volatile content of approximately 28 wt.%. The dried paste was ground to pass a 20 mesh (U.S. Sieve Series) in a micropulveriser was then blended with approximately 3 lbs. of $MoS_2$ pilling lubricant and approximately 30 lbs. of boehmite alumina similar to that commercially available from Davison Chemical Division of W. R. Grace & Co. The blend was well mixed in a Nauta mixer and pelleted to $\frac{1}{8}$-inch×$\frac{1}{8}$-inch in a commercial pilling machine at a green pellet crushed strength of approximately 20–25 psig. The pelleted catalyst was calcined for approximately three hours at 450° F. followed by approximately two hours at 800° F.

EXAMPLES 2–3

For comparison, two catalysts containing entirely magnesium oxide support designated Catalyst 2 and Catalyst 3 were prepared using the same amounts of the components and the same procedure employed in the preparation of Catalyst 1 with the major exception being the omission of the alumina component. Catalyst 2 was pilled at a green pellet crushed strength of approximately 15 psig and Catalyst 3 was pilled at a green pellet crushed strength of approximately 20–25 psig.

EXAMPLE 4

A catalyst, designated Catalyst 4, prepared to contain higher metal loadings of approximately 3 wt.% CoO and approximately 16 wt.% $MoO_3$ on an entirely magnesium oxide support was made as follows:

22.3 grams of cobalt nitrate and 39.0 grams of ammonium heptamolybdate were dissolved in 190 milliliters of warm distilled water and added to 162 grams of magnesia, commercially obtained from Basic Chemical Company as 98 HR magnesia; the mixture was allowed to slake, mixed to a paste, and dried at 250° F. overnight. The dried paste was then well blended with approximately 1 wt.% added $MoS_2$ and pilled to $\frac{1}{8}''\times\frac{1}{8}''$ pellets. The pelleted catalyst was calcined for approximately one hour at 450° F. followed approximately three hours at 800° F. The actual analysis and properties of the catalyst are presented in Table I.

Table I presents the analytical and physical properties of Catalysts 1–4.

TABLE I

| Catalyst($\frac{1}{8}''$ Pellets) | 1 | 2 | 3 | 4 |
|---|---|---|---|---|
| CoO, Wt.% | 1.1 | 1.1 | 1.2 | 3.0 |
| $MoO_3$, Wt.% | 5.0 | 5.7 | 5.4 | 16.6 |
| $Al_2O_3$, Wt.% | 9.2 | — | — | — |
| MgO, Wt.% | 85 | 93 | 93 | 80 |
| Surface Area, m²/g | 88 | 62 | 63 | — |
| Pore Volume, cc/g | 0.20 | 0.27 | 0.21 | — |
| Avg. Pore Diam, A | 90 | 174 | 133 | — |
| Crushing Strength, lb. | 8.0 | 6.6 | 5.8 | — |
| Abrasion Loss, % | 5.0 | 7.5 | 6.9 | — |
| Bulk Density, lb./ft.³ | 55.6 | 55.6 | 61.1 | 43.7 |

Catalyst surface properties presented in Table I were determined by conventional nitrogen adsorption technique.

Crushing strength of the catalyst was determined as follows: a pill is placed on its side between two parallel, horizontal flat plates, one stationary and one movable. A gradually increasing force is applied to the movable plate, perpendicular to the surface of the plate, until the pill breaks. The crushing strength is the force, in pounds, applied at the instant of pill breakage. Crushing strength reported is generally the average value determined on 100 pills.

Catalyst abrasion loss was determined by the following procedure: 100 grams of pelleted catalyst are loaded into a metal cylinder 10 inches in diameter and 6 inches high which contains one radial baffle $5\frac{1}{2}$ inches long that extends 2 inches from the side toward the axis of the cylinder. The cover is replaced and the cylinder rotated horizontally on its axis at 60 RPM for 30 minutes. At the end of the test, the catalyst charge is sieved through a 20 mesh screen and that which remains on the screen is weighed. The difference between this weight (in grams) and the original 100 grams is reported as weight percent loss by abrasion.

CATALYST PERFORMANCE

Catalysts 1–4 were tested for ability to desulfurize a cracked naphtha feedstock with properties presented in Table II.

TABLE II

| FEED PROPERTIES | |
|---|---|
| Gravity, ° API | 51.0 |
| Sulfur, Wt. % | .174 |
| Bromine Number | 37.1 |
| Hydrocarbon Type, Vol. % | |
| Saturates | 48.0 |
| Olefins | 17.5 |
| Aromatics | 34.5 |
| ASTM Distillation | |
| ° F. at IBP | 106 |
| 10% overhead | 162 |
| 50 | 278 |
| 90 | 400 |
| FBP | 434 |

Each catalyst performance was evaluated using a bench scale, isothermal reactor having one-half inch internal diameter and provided with an axial thermowell. Operation was downflow with once-through hydrogen and oil. Each catalyst was used in the form of 12-to-20 mesh granules obtained by crushing and screening the pellets and each catalyst charge was approximately 17.4 grams. The catalyst was supported near the center of the reactor on a layer of 3 mm Pyrex glass beads and a preheat zone of 5 mm beads was provided above the catalyst bed.

Each catalyst was presulfided at atmospheric pressure and 700° F. using 8 volume percent hydrogen sulfide in hydrogen and a gas flow rate of about 0.5 cubic feet per hour for a period of 16–24 hours.

Unless otherwise specified, operating conditions for each run were approximately 150 psig, a temperature of approximately 560° F., a weight hourly space velocity (WHSV) of approximately 2, and a hydrogen rate of approximately 1,000 SCFB.

During each day, at least a 4-hour sample of the product was collected and was subsequently washed with acidified cadmium sulfate solution to remove hydrogen sulfide. This washing procedure was adapted from ASTM D-1323 procedure for mercaptan analysis. The product was then analyzed for sulfur by X-ray fluorescence technique and for bromine number by an adapted ASTM D-1159 procedure. The change in bromine number was used as the measure of olefin saturation.

Performance results are presented in FIG. 1 and in Table III.

TABLE III

| Catalyst | Hours on Oil | Sulfur, ppm | Bromine No. cg/g | Desulfurization, Wt. % | Olefin Saturation Wt. % | Selectivity |
|---|---|---|---|---|---|---|
| 1 | 127 | 184 | 30.4 | 89.4 | 17.9 | 11.4 |
| 2 | 123 | 177 | 27.9 | 89.8 | 21.6 | 9.4 |
| 3 | 127 | 109 | 25.4 | 93.7 | 28.6 | 8.2 |
| 4 | 90 | 171 | 27.0 | 90.7 | 27.2 | 7.5 |

The values for sulfur reduction are presented as weight percent desulfurization and weight percent olefin saturation is also presented. The selectivity presented is defined as the ratio of first order reaction rate constants for desulfurization over saturation; for an integral or plug-flow reactor, selectivity is expressed by the relation $$\text{selectivity} = \log f_s / \log f_o$$

where $f_s$ and $f_o$ are the fractions remaining of sulfur and olefins after desulfurization.

Selectivity is the overriding concern in the hydrodesulfurization of the cracked naphtha since the olefin saturation most strongly determines what octane loss will occur at a given level of desulfurization. Therefore, process economics are quite sensitive to selectivity.

As FIG. 1 demonstrates a catalyst of this invention embodied in Catalyst 1 achieved a surprising selectivity improvement over Catalyst 2–4 which contain entirely magnesium oxide supports. Selected comparative data for performance of the catalysts at approximately the same level of desulfurization is presented in Table III. Specifically, at 123 hours on oil Catalyst 2 performed at a desulfurization level of approximately 89.8 wt.% and achieved a selectivity of approximately 9.4; in comparison the catalyst of this invention, embodied in Catalyst 1, at 127 hours an oil performed at the same desulfurization level, 89.4 wt. %, but achieved a selectivity of 11.4 in performance surprisingly superior to Catalyst 2 as well as Catalysts 3 and 4.

Catalyst 4 containing higher hydrogenation metal loading, achieved such high desulfurization performance at a weight hourly space velocity of 2 that the space velocity was increased to approximately 5.3 at the beginning of the run shown in FIG. 1 and the space velocity was again increased to approximately 10.7 for the remainder of the run shown in FIG. 1 in order to allow selectivity comparison at comparable desulfurization level.

Overall, the selectivity performance of Catalyst 1 is surprisingly significantly greater than the selectivity performance of Catalysts 2–4 throughout every run, as FIG. 1 clearly demonstrates.

I claim:

1. A method for preparing hydrodesulfurization catalyst comprising Group VIB metal and Group VIII metal on a solid support comprising magnesium oxide and aluminum oxide, which method comprises:
   (1) forming an aqueous composition comprising dissolved Group VIB and Group VIII metal compounds and suspended magnesia;
   (2) drying the composition of step 1;
   (3) blending compositions comprising the product of step 2 and particulate alumina;
   (4) forming the product of step 3 into pellets; and
   (5) calcining said pellets.

2. The method of claim 1 wherein the alumina in step 3 is sufficient to provide about 5–50 wt.% aluminum oxide in the calcined catalyst.

3. The method of claim 1 wherein said Group VIB metal comprises molybdenum and said Group VIII metal comprises cobalt.

4. The method of claim 1 wherein the compositions blended in step 3 comprise molybdenum sulfide.

5. A catalyst prepared by the method of claim 1.

6. The catalyst of claim 5 wherein said catalyst comprises about 5–50 wt.% aluminum oxide.

7. The catalyst of claim 5 wherein the Group VIB metal comprises molybdenum and the Group VIII metal comprises cobalt.

8. A process for the selective desulfurization of cracked naphthas, which process comprises contacting a cracked naphtha in a reaction zone under hydrodesulfurization conditions and in the presence of hydrogen with a catalyst prepared by a method which comprises:
   (1) forming an aqueous composition comprising dissolved Group VIB and Group VIII metal compounds and suspended magnesia;
   (2) drying the composition of step 1;
   (3) blending compositions comprising the product of step 2 and particulate alumina; and
   (4) forming the product of step 3 into pellets;
   (5) calcining said pellets.

9. The process of claim 8 wherein said catalyst comprises about 5–50 wt.% aluminum oxide.

10. The process of claim 8 wherein said catalyst comprises Group VIB metal and Group VIII metal in at least one form selected from the elements, their oxides, and their sulfides.

11. The process of claim 8 wherein said Group VIB metal of said catalyst is molybdenum and said group VIII metal is cobalt.

12. The process of claim 8 wherein said hydrodesulfurization conditions comprise a temperature of about 450° F. to about 750° F., a total pressure of about 75 psig to about 600 psig, a hydrogen-to-hydrocarbon ratio of about 200 SCFB to about 5,000 SCFB, and a WHSV of about 0.5 to about 15 weight units of hydrocarbon per hour per weight unit of catalyst.

13. The process of claim 11 wherein said catalyst comprises about 8–12 wt.% aluminum oxide.

* * * * *

UNITED STATES PATENT OFFICE
CERTIFICATE OF CORRECTION

Patent No. 4,203,829            Dated May 20, 1980

Inventor(s) Ralph J. Bertolacini

It is certified that error appears in the above-identified patent and that said Letters Patent are hereby corrected as shown below:

| Patent Column | Line | |
|---|---|---|
| 1 | 34 | "catalysts that are used" should be --catalysts are used-- |
| 3 | 13 | "dry-blended" should be --dry blended-- |
| 5 | 10 | "micropulveriser was" should be --micropulveriser and was-- |
| 5 | 46 | "followed approximately" should be --followed by approximately-- |
| 5 | 58 | "Avg. Pore Diam, A" should be --Avg. Pore Diam, $\overset{o}{A}$-- |
| 7 | 41 | "hours an oil" should be --hours on oil-- |
| 8 | 36-39 | "(3)...alumina; and (4)...; and (5)..." should be "(3)...alumina; (4)...; and (5)-- |

Signed and Sealed this

Seventh Day of October 1980

[SEAL]

Attest:

SIDNEY A. DIAMOND

Attesting Officer     Commissioner of Patents and Trademarks